(12) United States Patent
Yamada et al.

(10) Patent No.: US 6,466,296 B1
(45) Date of Patent: Oct. 15, 2002

(54) LCD WITH GROOVE STRUCTURE TO DEFINE LIQUID CRYSTAL REGIONS

(75) Inventors: Nobuaki Yamada, Osaka (JP); Takashi Kurihara, Nara-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/400,860

(22) Filed: Sep. 21, 1999

(30) Foreign Application Priority Data

Sep. 21, 1998 (JP) .......................................... 10-267111

(51) Int. Cl.[7] ...................... G02F 1/1337; G02F 1/1343
(52) U.S. Cl. ........................ 349/160; 349/130; 349/156
(58) Field of Search ................................ 349/156, 123, 349/130, 191, 32, 160

(56) References Cited

U.S. PATENT DOCUMENTS

| | | | | |
|---|---|---|---|---|
| 4,861,143 A | * | 8/1989 | Yamazaki et al. | 350/350 |
| 5,309,264 A | * | 5/1994 | Lien et al. | 359/87 |
| 5,488,499 A | * | 1/1996 | Tanaka et al. | 359/102 |
| 5,589,964 A | * | 12/1996 | Hotta et al. | 349/160 |
| 5,796,457 A | * | 8/1998 | Ukai et al. | 349/119 |
| 6,067,141 A | * | 5/2000 | Yamada et al. | 349/129 |
| 6,115,098 A | * | 9/2000 | Kume et al. | 349/156 |
| 6,140,988 A | * | 10/2000 | Yamada | 345/88 |
| 6,144,434 A | * | 11/2000 | Kim et al. | 349/130 |
| 6,243,146 B1 | * | 6/2001 | Rho et al. | 349/42 |
| 6,262,783 B1 | * | 7/2001 | Tsuda et al. | 349/39 |
| 6,266,121 B1 | * | 7/2001 | Shigeta et al. | 349/156 |
| 6,271,902 B1 | * | 8/2001 | Ogura et al. | 349/106 |
| 6,292,246 B1 | * | 9/2001 | Shinohara et al. | 349/143 |

FOREIGN PATENT DOCUMENTS

| | | |
|---|---|---|
| JP | 6-301015 A | 10/1994 |
| JP | 7-120728 A | 5/1995 |
| JP | 9-197384 A | 7/1997 |
| JP | 10-186331 A | 7/1998 |
| JP | 1-217396 A | 8/1998 |

* cited by examiner

*Primary Examiner*—Toan Ton
*Assistant Examiner*—Andrew Schechter
(74) *Attorney, Agent, or Firm*—Nixon & Vanderhye P.C.

(57) ABSTRACT

A liquid crystal display device includes a first substrate, a second substrate disposed facing the first substrate, a liquid crystal layer having liquid crystal molecules, interposed between the first and second substrates, and a groove structure having a plurality of grooves provided on the first substrate. The liquid crystal layer includes a plurality of liquid crystal regions defined by the plurality of grooves.

21 Claims, 9 Drawing Sheets

Light-extinction region

LCD WITH GROOVE STRUCTURE TO DEFINE LIQUID CRYSTAL REGIONS

BACKGROUND OF THE INVENTION

1. Field of the Invention

The present invention relates to a liquid crystal display device, and more particularly to a liquid crystal display device with a large screen having wide viewing angle characteristics

2. Description of the Related Art

In the prior art, there has been a display device utilizing electro-optical effects, such as a twisted nematic (TN) or super twisted nematic (STN) type liquid crystal display device. Now technology has been vigorously studied such that the viewing angle of such a liquid crystal display device may be enhanced.

An example of the technology for enhancing the viewing angle is seen in a TN type liquid crystal display device in which liquid crystal molecules are axially symmetrically aligned in each of liquid crystal regions separated by a wall of polymer (protrusion-like structures), namely, a so-called Axially symmetrically aligned Microcell (ASM) mode liquid crystal display device, as disclosed in Japanese Laid-Open Publication Nos. 6-301015 and 7-120728. A liquid crystal region surrounded by the polymer wall typically corresponds to a pixel region. In the ASM mode liquid crystal display device, liquid crystal molecules are axially symmetrically aligned, so that an observer recognizes less variation in contrast in any viewing directions; that is, wide viewing angle characteristics are obtained.

A production method of such an ASM mode liquid crystal display device is disclosed in Japanese Laid-Open Publication No. 7-120728. In accordance with the method disclosed in the publication, a protrusion-like structure is formed on a substrate in a grid pattern so that liquid crystal molecules are axially symmetrically aligned by the interaction between the protrusion-like structure and the liquid crystal molecules. Japanese Laid-Open Publication No. 10-133206 discloses another ASM mode liquid crystal display device in which the axially symmetrical alignment is achieved by the combination of a liquid crystal material of negative dielectric anisotropy (N-type liquid crystal material) and a vertical alignment layer.

A plasma addressed liquid crystal display device has potential as a large size liquid crystal display device and thus has been vigorously developed. An example of the plasma addressed liquid crystal display device is disclosed in Japanese Laid-Open Publication No. 1-217396. The plasma addressed liquid crystal display device includes a substrate, a thin dielectric sheet, ribs disposed between the substrate and the dielectric sheet, and a discharge channel (plasma channel) in the shape of a line surrounded by the substrate, the dielectric sheet and the ribs. The state of plasma discharge is changed by switching a voltage applied to noble gas filled in the discharge channel using an anode electrode and a cathode electrode. A liquid crystal layer is driven by a voltage applied between the discharge channel and a counter electrode, via the dielectric sheet.

The device disclosed in Japanese Laid-Open Publication No. 1-217396 is of the TN mode and therefore has a problem with its viewing angle characteristics. In order to solve this problem, Japanese Laid-Open publication Nos. 9-197384 and 10-186331 each disclose a plasma addressed liquid crystal display device of the above-described ASM mode.

However, the present inventors have found that the conventional ASM mode liquid crystal display device and the conventional ASM mode plasma addressed liquid crystal display device have the following problems (1) and (2).

(1) Reduction in Transmittance

Figure 1:
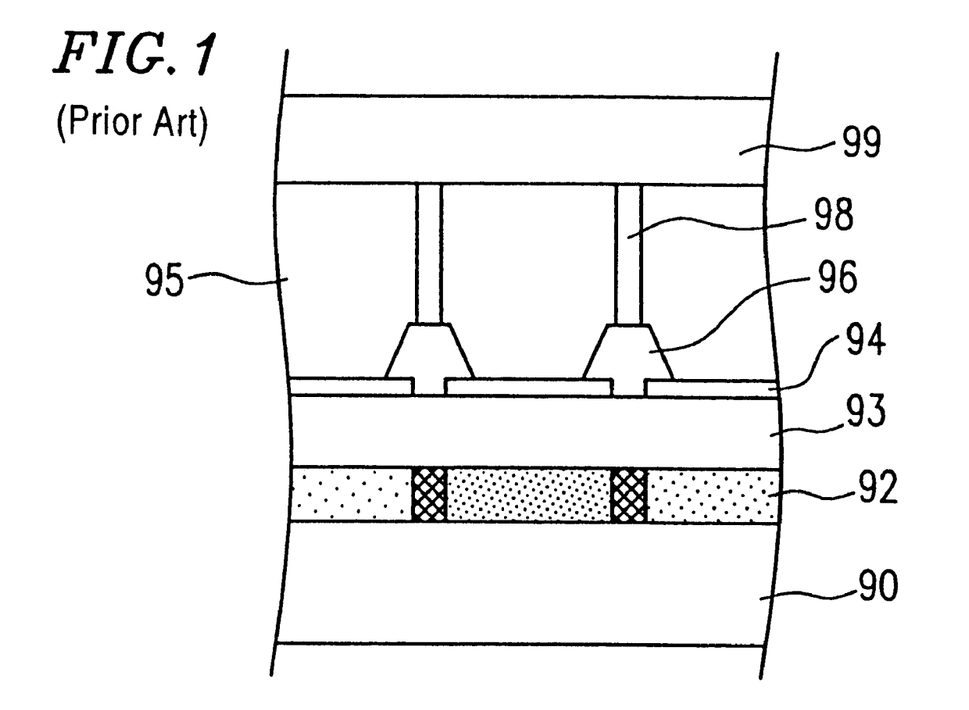
FIG. 1 is a cross-sectional view of a conventional axially symmetrical mode liquid crystal display device.
Figure 2:
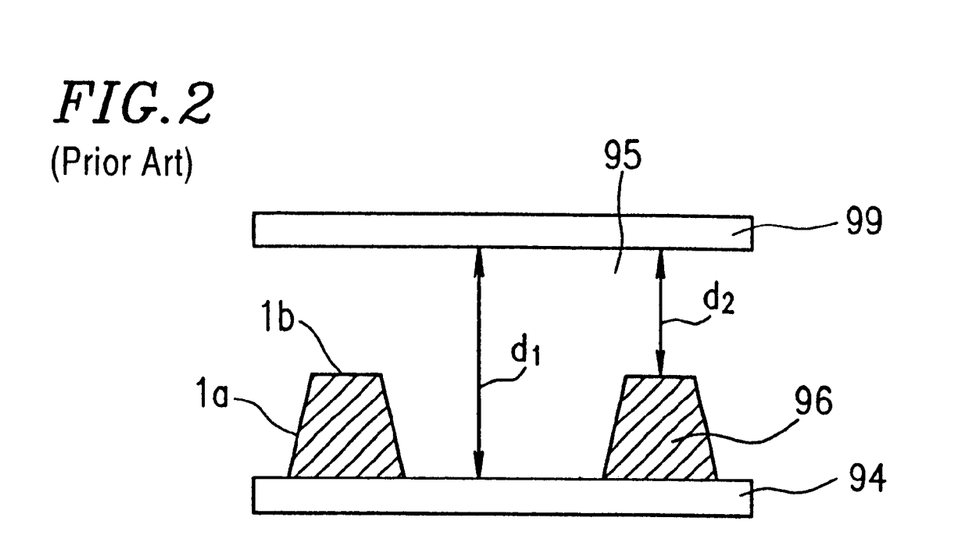
FIG. 2 is a schematic view for explaining a difference in transmittance due to a difference in cell gap in the conventional liquid crystal display device shown in FIG. 1.

FIG. 1 illustrates a part of the above-described ASM mode liquid crystal display device including a protrusion-like structure 96. A color filter layer 92, an overcoat layer 93 and a transparent electrode 94 are formed on a glass plate 90. The protrusion-like structure 96 and a column-like protrusion 98 are formed in a liquid crystal layer 95 which is disposed over those layers and the electrode. A counter substrate 99 is disposed on the column-like protrusion 98. When the protrusion-like structure 96 is black, i.e., light-blocking, and formed within a pixel region, an aperture ratio is significantly reduced and thus transmittance is decreased. When the protrusion-like structure 96 is transparent, the above-described problem does not arise. Nevertheless, the above ASM mode liquid crystal display device still has a disadvantage of a reduction in the aperture ratio, which will be described below with reference to FIG. 2. As schematically illustrated in FIG. 2, the liquid crystal layer 95 has a thickness of d1 between the transparent electrode 94 and the counter substrate 99, but a thickness of d2 directly above the protrusion-like structure 96 is smaller than d1. A portion of the liquid crystal layer 95 having the smaller thickness of d2 does not sufficiently contribute to display. In this case, when an N-type liquid crystal material is used, the state of display appears the same as when the reduction in the aperture ratio decreases the transmittance. When a P-type liquid crystal material (i.e., a liquid crystal material of positive dielectric anisotropy) is used, the contrast of display is reduced. This occurs for the following reason. The liquid crystal display device is designed using as a reference the thickness of d1 across the region having no protrusion-like structure 96. In the case where the thickness of d2 across the liquid crystal layer 95 directly above the protrusion-like structure 96 largely differs from d1, the retardation of such a region of the liquid crystal layer is deviated from the designed value, thus reducing the amount of light contributing to display.

(2) Slow Response Speed for a Gray Scale Image

In a conventional plasma addressed liquid crystal display device, a voltage is applied across a liquid crystal layer and a thin dielectric sheet (e.g., a glass sheet about 50 $\mu$m thick). The voltage applied across the liquid crystal layer largely depends on the thickness of the liquid crystal layer. When the plasma addressed liquid crystal display device is of the ASM mode in which the above-described protrusion-like structure is used, a voltage applied across the liquid crystal layer directly above the protrusion-like structure is not sufficient since the thickness of such a region of the liquid crystal layer is thinner than the thickness of a region having no protrusion-like structure. Therefore, such a portion of the liquid crystal layer has a significantly slow response speed, reducing the entire response speed in displaying a gray scale image.

SUMMARY OF THE INVENTION

A liquid crystal display device according to the present invention includes a first substrate, a second substrate disposed facing the first substrate, a liquid crystal layer having liquid crystal molecules, interposed between the first and second substrates, and a groove structure having a plurality of grooves provided on the first substrate. The liquid crystal layer includes a plurality of liquid crystal regions defined by the plurality of grooves.

In one embodiment of the invention, the liquid crystal molecules in at least one of the plurality of liquid crystal regions are axially symmetrically aligned.

In one embodiment of the invention, the liquid crystal display device further includes a vertical alignment layer provided on a surface of at least one of the first and second substrates facing the liquid crystal layer. The liquid crystal layer includes a liquid crystal material of negative dielectric anisotropy.

In one embodiment of the invention, a side wall of the plurality of grooves is sloped with respect to a substrate surface.

In one embodiment of the invention, a slope angle of the sloped side wall is in the range of about 5° to about 70°.

In one embodiment of the invention, a transparent electrode is provided between the liquid crystal layer and the groove structure.

In one embodiment of the invention, at least two of the liquid crystal regions correspond to a pixel region, and at least one of the grooves is provided in the pixel region.

In one embodiment of the invention, the plurality of grooves are disposed in a grid pattern.

In one embodiment of the invention, one of the first and second substrates is a plasma cell having a plasma channel for applying voltage to the liquid crystal layer.

In one embodiment of the invention, a product of a thickness d of the liquid crystal layer at the liquid crystal region and refractive index anisotropy $\Delta n$, i.e., d·$\Delta n$, is in the range of about 300 nm to about 600 nm.

In one embodiment of the invention, a polymer layer for stabilizing an alignment state of the liquid crystal layer is provided on the vertical alignment layer.

In one embodiment of the invention, the first and second substrates respectively have polarizers, the polarization axes of the polarizers provided on the first and second substrates are perpendicular to each other, and a compensation film is provided between at least one of the polarizers and the substrate including the at least one of the polarizers.

In one embodiment of the invention, the alignment directions of the liquid crystal molecules continuously vary in at least one of the plurality of liquid crystal regions.

In one embodiment of the invent ion, the alignment directions of the liquid crystal molecules continuously vary from within the groove to a region directly above the groove to an inward region of the liquid crystal region.

Hereinafter, functions of the present invention will be described.

In the liquid crystal display device according to the present invention, the grooves formed in the groove structure control the alignment state of the liquid crystal region in such a manner that continuously varies the alignment directions of the liquid crystal molecules. Thus, walls for separating the liquid crystal regions as used in the prior art are not necessary. Therefore, a reduction in transmittance can be thus prevented, and wide viewing angle characteristics are realized. Furthermore, the liquid crystal molecules within a groove region respond (change their orientation) prior to, and have influence on, the other portion of the liquid crystal region, unlike the liquid crystal molecules above the conventional protrusion-like structure, so that the apparent response speed becomes faster for producing a gray scale image.

When the liquid crystal molecules are axially symmetrically aligned in the liquid crystal region, wider viewing angle characteristics are realized.

When the vertical alignment layer is further provided on the surface facing the liquid crystal layer of the substrate, and the liquid crystal layer includes a material of negative dielectric anisotropy, display having a high degree of contrast can be realized in a normally black mode.

When the side wall of the groove of the groove structure is sloped, the orientations of the liquid crystal molecules aligned perpendicular to the side wall are effectively controlled in the presence of an applied voltage. The alignment control of the liquid. crystal molecules is stabilized, particularly when the slope angle of the sloped side wall is in the range of about 5° to about 70°.

When the transparent electrode is provided between the groove structure and the vertical alignment layer, the groove structure does not cause a decrease in a voltage between the transparent electrode and the liquid crystal layer, so that the driving voltage for the liquid crystal layer can be reduced.

Even when the groove is provided in the pixel region, the liquid crystal molecules within the groove contribute to display, so that the transmittance is not reduced. Accordingly, a large pixel region can include, for example, a plurality of the liquid crystal regions, and thus the response speed of the liquid crystal layer can be fast.

When the grooves are disposed in a grid pattern, the liquid crystal molecules in the liquid crystal layer can be driven in the axially symmetrical mode while the liquid crystal region surrounded by the grooves is in register with the pixel region.

When the plasma substrate is used in the liquid crystal display device of the present invention, the device can be driven in the plasma addressed mode. In this case, the liquid crystal layer has a larger thickness at the groove region where a larger voltage is applied to the liquid crystal molecules than the other regions. In particular, the plasma addressed liquid crystal display device can be effectively driven by a low voltage.

When the retardation of the liquid crystal layer, which is a product of the thickness d of the liquid crystal layer and the refractive index anisotropy $\Delta n$, is in the range of about 300 nm to about 600 nm, a satisfactory contrast is obtained.

When a polymer layer for stabilizing the alignment state of the liquid crystal layer is formed on the vertical alignment layer using a polymer stabilizing technique, the stabilization of the alignment state is further ensured.

When a pair of substrates have polarizers in such. a way that their polarization axes are perpendicular to each other, and at least one compensation film having negative refraction index anisotropy is provided between either pair of the substrates and the polarizer, the viewing angle is further improved.

Thus, the invention described herein makes possible the advantages of providing a liquid crystal display device having a high degree of transmittance, a fast response speed for producing a gray scale image, and a wide viewing angle.

These and other advantages of the present invention will become apparent to those skilled in the art upon reading and understanding the following detailed description with reference to the accompanying figures.

DESCRIPTION OF THE PREFERRED EMBODIMENTS

As described above, a problem with the conventional ASM mode liquid crystal display device is that the protrusion-like structure (typically formed as a polymer wall) reduces transmittance or contrast and thus a response speed is slowed when displaying a gray scale image. An ASM mode liquid crystal display device according to the present invention includes a pair of substrates, a liquid crystal layer interposed between the pair of substrates, and a groove structure having a plurality of grooves. The groove structure is provided on a surface of at least one of the pair of substrates, the surface facing the liquid crystal layer. Furthermore, polarizers may be provided on the pair of substrates in such a way that their polarization axes are perpendicular to each other, and at least one compensation film having negative refraction index anisotropy is provided between either pair of the substrates and the polarizer. The provided compensation film further improves the viewing angle of a liquid crystal display device. In the case of a plasma addressed liquid crystal display device, the groove structure may be formed on a substrate on which signal electrodes are to be provided or on a thin dielectric sheet interposed between the signal electrodes and plasma channels. A structure and features of the liquid crystal display device of the present invention will be described in greater detail below.

(Alignment Effect Due to a Groove Structure)

Figure 3A:
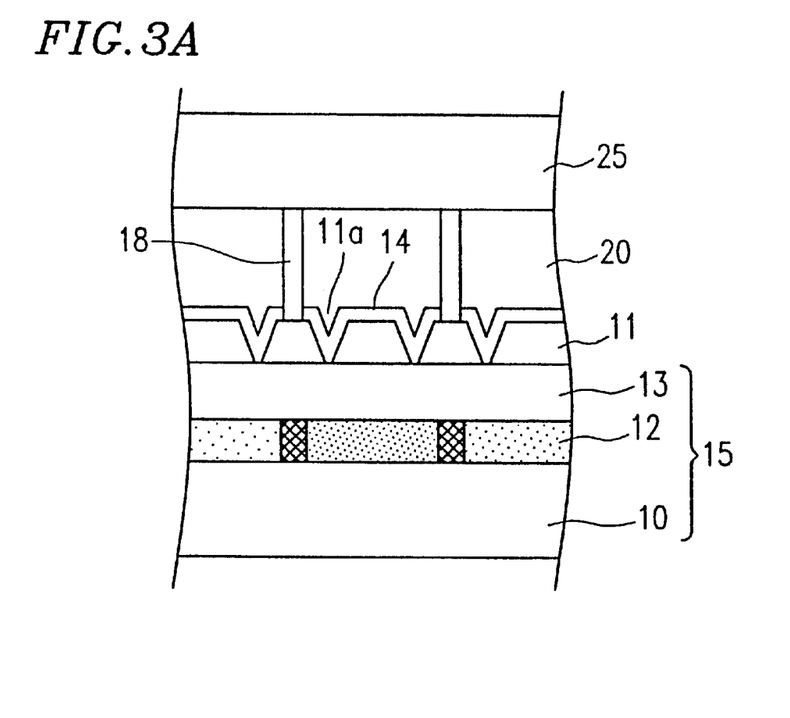
FIG. 3A is a cross-sectional view of a liquid crystal display device according to the present invention.
Figure 3B:
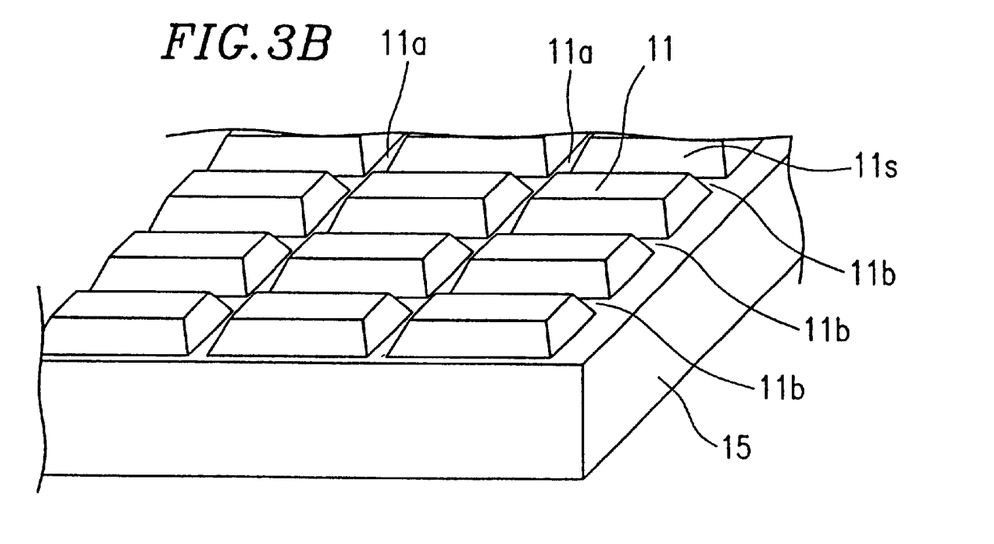
FIG. 3B is a perspective view of a part of the liquid crystal display device shown in FIG. 3A.

FIG. 3A is a partial cross-sectional view of an ASM mode liquid crystal display device according to the present invention, including a groove structure 11. FIG. 3B is a perspective view of a part of the ASM mode liquid crystal display device shown in FIG. 3A.

As shown in FIG. 3A, the ASM mode liquid crystal display device includes a first substrate 15, a second substrate 25, and a liquid crystal layer 20 interposed between the first substrate 15 and the second substrate 25. The first substrate 15 includes, sequentially, a plate 10, a color filter 12, and an overcoat layer 13. As shown in FIG. 3A, the groove structure 11 has a plurality of grooves 11a extending in a first direction and a plurality of grooves 11b extending in a second direction substantially perpendicular to the first direction. Each of the grooves 11a and 11b is defined by side walls 11s. As shown in FIG. 3A, a transparent electrode 14 and a column-like structure 18 are provided on the groove structure 11. The column-like structure 18 defines the thickness of the liquid crystal layer 20.

Referring to FIGS. 4A through 4D, an exemplary operation of liquid crystal molecules 22 in the liquid crystal layer 20 when an N-type liquid crystal material is used will be described below. A vertical alignment layer is provided on the groove structure 11 when the N-type liquid crystal material is used. The liquid crystal display device using the N-type liquid crystal material operates in a normally black mode, so that disclination lines are not generated at a border between liquid crystal regions. Moreover, a black level in the absence of an applied voltage is determined by the crossed Nicols state of polarizers and thus the device achieves a higher degree of contrast than the conventional ASM mode liquid crystal display device of a normally white mode.

Figure 4A:
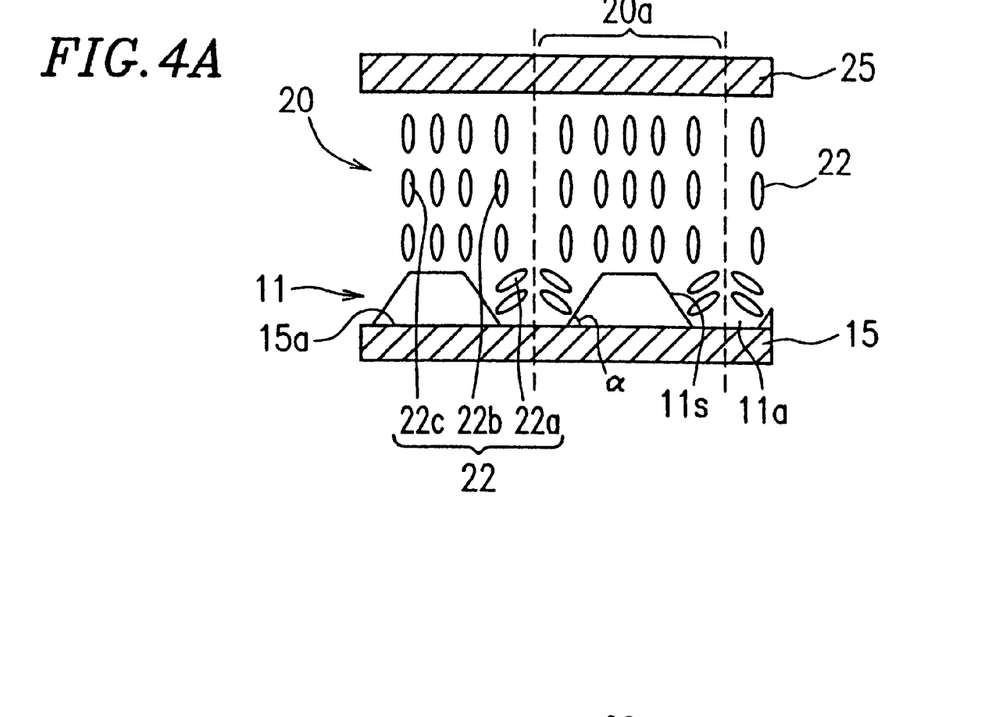
FIGS. 4A through 4D are cross-sectional views illustrating the operation of liquid crystal molecules in the liquid crystal display device shown in FIG. 3A.

The liquid crystal region 20 is divided into a plurality of liquid crystal regions 20a by the grooves 11a of the groove structure 11.

Figure 4B:
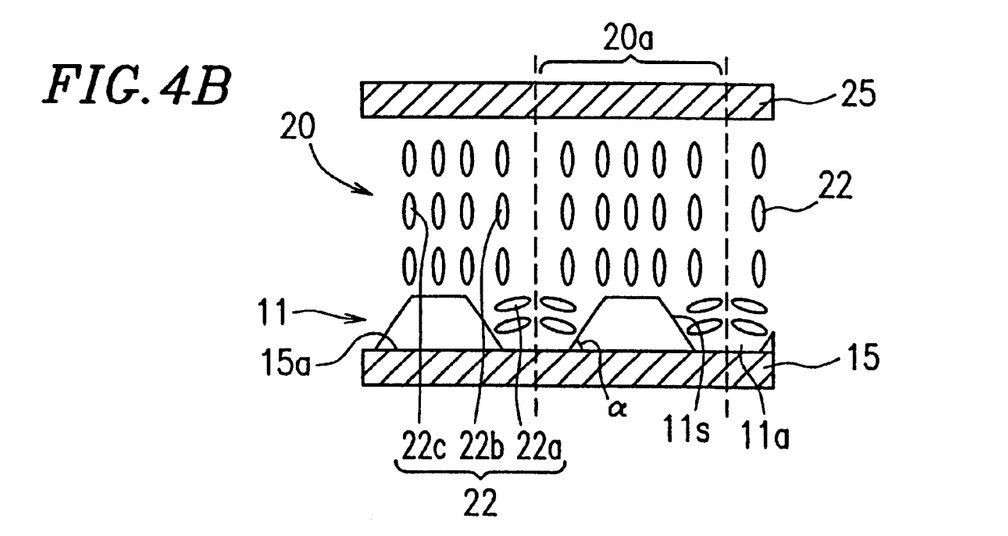

As illustrated in FIG. 4A, in the absence of an applied voltage, the liquid crystal molecules 22 are aligned in a substantially perpendicular direction to a surface 15a of the first substrate 15 which faces the groove structure, except for the liquid crystal molecules 22a within the groove 11a. The surface 15a will be referred to as a "substrate surface". As a voltage is applied across the liquid crystal layer 20 on the substrate 15, the liquid crystal molecules 22a within the groove 11a tilt toward a direction parallel to the substrate surface 15a as shown in FIG. 4B. The side walls 11s defining the groove 11a are more effective in regulating alignment when sloped with respect to the substrate surface 15a. A slope angle α is preferably in the range of 5° to 70°, and more preferably in the range of 5° to 45°. In the case where the side walls 11s are perpendicular to the substrate surface 15a (α=90°), the liquid crystal molecules 22a are aligned perpendicularly to the side walls 11s, i.e., parallel to the substrate surface 15a in the absence of an applied voltage. Therefore, an applied voltage has a lesser effect of tilting the liquid crystal molecules 22a toward a direction parallel to the substrate surface 15a.

Figure 4C:
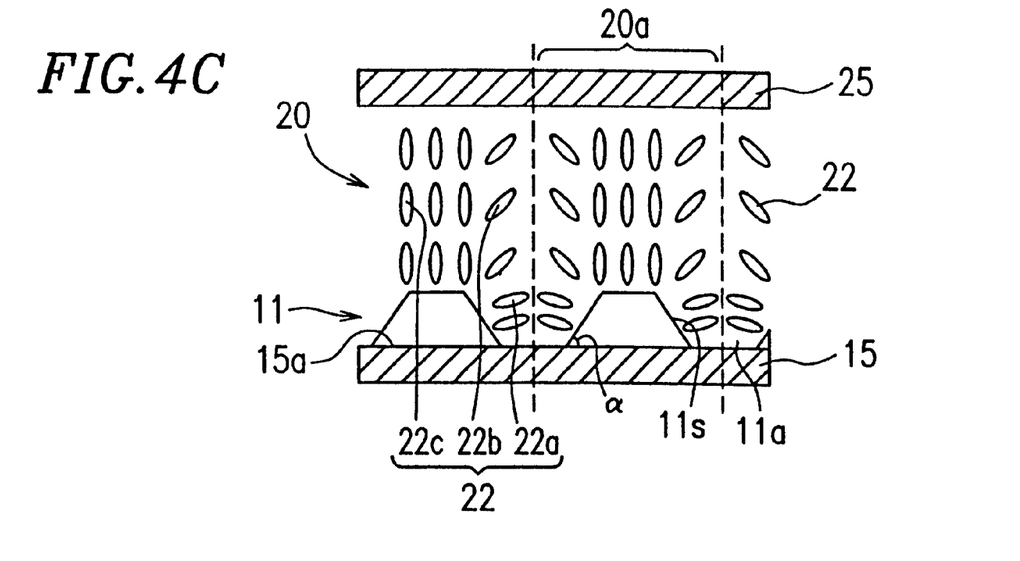
Figure 4D:
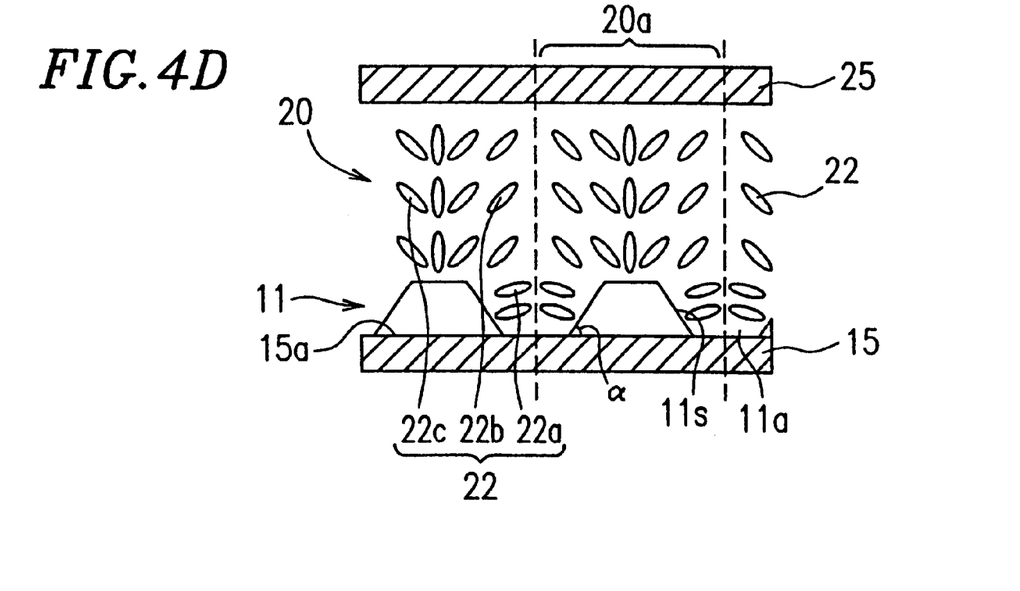

As shown in FIG. 4C, the alignment of the liquid crystal molecules 22a within the groove 11a has an effect of aligning the liquid crystal molecules 22b directly above the groove 11a so that upper ends of the liquid crystal molecules 22b are directed more inward toward the groove 11a than lower ends of the liquid crystal molecules 22b. The aligned liquid crystal molecules 22b in turn have an effect on the remaining liquid crystal molecules 22c as shown in FIG. 4D. The effect ripples through the entire liquid crystal region 20a. In this manner, the liquid crystal molecules 22 are continuously aligned in the liquid crystal region 20a. A groove 11b shown in FIG. 3B has the same function as the groove 11a, although not explained herein.

Figure 5:
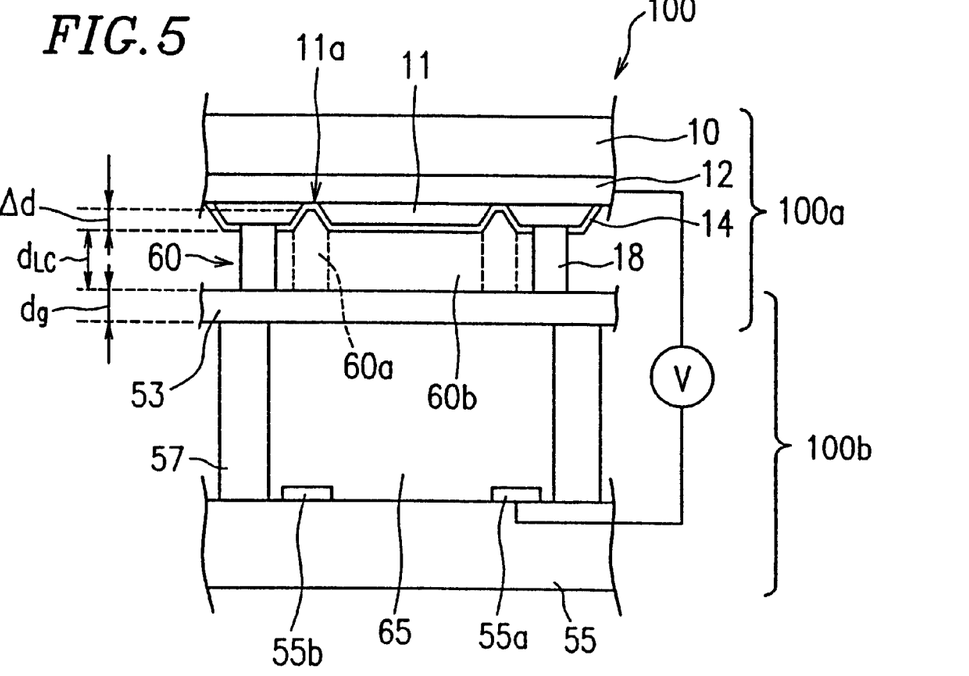
FIG. 5 is a cross-sectional view of a plasma addressed liquid crystal display device including a groove structure according to the present invention.

The alignment effect produced by the grooves 11a and 11b of the groove structure 11 of the present invention is particularly significant for plasma addressed liquid crystal devices. FIG. 5 illustrates a plasma addressed liquid crystal display device of the present invention incorporating such a groove structure.

The plasma addressed liquid crystal display device 100 shown in FIG. 5 has a flat panel structure including a display cell 100a for modulating incident light into outgoing light according to a pixel signal and performing display, and a plasma cell 100b for selectively driving (addressing) the pixel region. The display cell 100a and the plasma cell 100b share a dielectric sheet 53.

The plasma cell 100b includes a glass plate 55, the dielectric sheet 53, ribs 57, and discharge channels 65. FIG. 5 shows only one discharge channel 65. The discharge channels 65 are arranged in rows and each discharge channel 65 is surrounded by the plate 55, the dielectric sheet 53, and the ribs 57. The display cell 100a is scanned by the discharge channels 65 successively generating plasma discharge row by row. The discharge channel 65 has a space accommodating an anode electrode 55a and a cathode electrode 55b. Naturally, a power supplying circuit for applying a voltage between the anode electrode 55a and the cathode electrode 55b in order to generate plasma discharge, a scanning circuit for controlling the scanning, and the like are provided, though not shown. Components necessary for driving the plasma Addressed liquid crystal display device 100 may be those used in conventional plasma addressed liquid crystal display devices.

The display cell 100a includes signal electrodes 14 which are substantially perpendicular to the discharge channels 65. The signal electrodes 14 are arranged in columns. The pixel regions are defined at intersections of the signal electrodes 14 and the discharge channels 65. The signal electrodes 14 are preferably formed on the groove structure 11, but may be provided between the groove structure 11 and the color filter layer 12. An overcoat layer (not shown) may be provided on the color filter layer 12. Liquid crystal molecules (not shown in FIG. 5) in a liquid crystal layer 60 are driven on a pixel-region-by-pixel-region basis by a voltage applied by the signal electrode 14 being synchronized with a voltage applied via the dielectric sheet 53 by the discharge channel 65. Thus, the incident light is modulated.

The plasma cell 100b is formed by bonding an assembly of the glass plate 55, the ribs 57, the anode electrode 55a and the cathode electrode 55b to a lower surface of the dielectric sheet 53. The display cell 100a is formed by bonding an assembly of the glass plate 10, the color filter layer 12, the groove structure 11, and the signal electrodes 14 via a column-like structure 18 to an upper surface of the dielectric sheet 53. A thickness of the liquid crystal layer 60 (cell gap) is defined by a portion of the groove structure 11 and the column-like structure 18. The column-like structure 18 is disposed directly below a black matrix (not shown) of the color filter layer 12. Vertical alignment layers (not shown) are formed on the surfaces facing the liquid crystal layer 60, of the dielectric sheet 53 and the glass plate 10 so as to cover the signal electrode 14, the groove structure 11, and the column-like structure 18. The vertical alignment layers are made of, for example, polyimide (e.g., JALS-204 produced by Japan Synthetic Rubber Co., Ltd.).

In the plasma addressed liquid crystal display device 100 according to the present invention, the depth of the groove 11a particularly has an influence on the characteristics of display. The relationship between the depth of the groove 11a and the characteristics of display will be described below.

Figure 6:
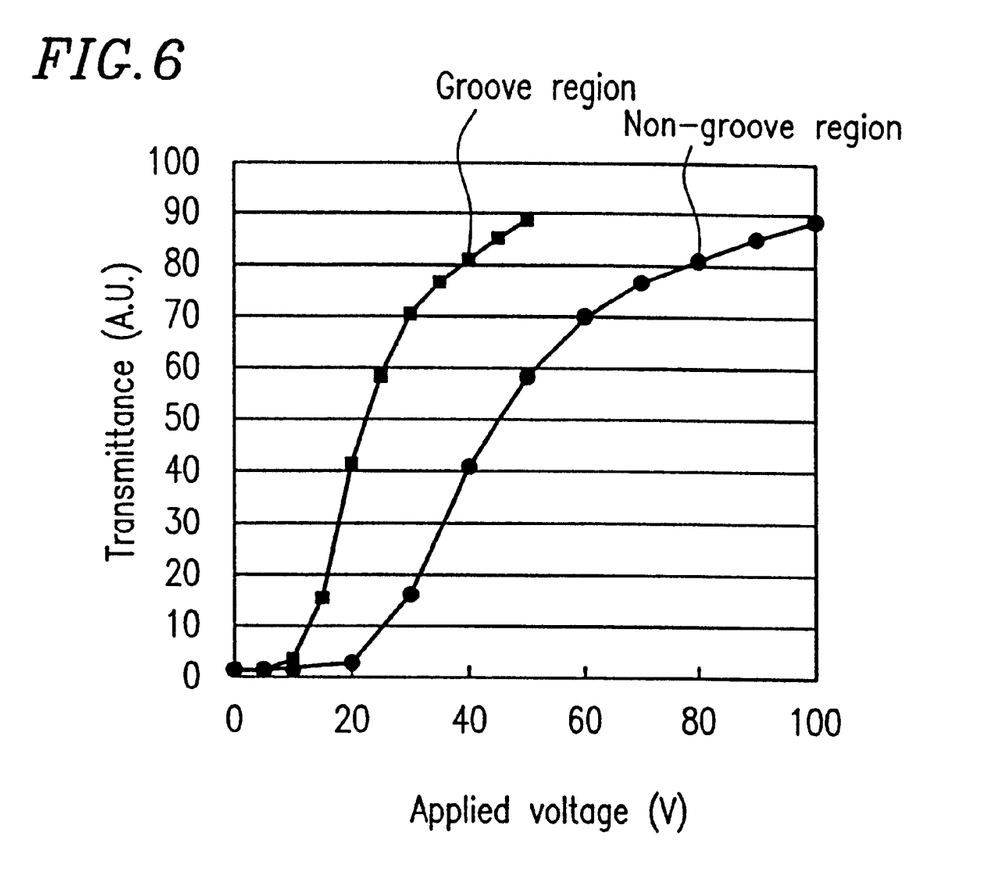
FIG. 6 is a graph illustrating externally applied voltage-transmittance characteristics of a liquid crystal layer in the plasma addressed liquid crystal display device shown in FIG. 5.

When the transparent signal electrode 14 is provided on the groove structure 11, a non-groove region 60b has an applied voltage $V_{LC}$ represented by the following expression:

$$V_{LC}=V/(1+d_g \cdot \in_{LC}/d_{LC} \cdot \in_g)$$

where V indicates an externally applied voltage between the anode electrode 55a and the transparent electrode 14; $\in_{LC}$ and $\in_g$ indicate the dielectric constants of the liquid crystal layer 60 and the dielectric sheet 53, respectively; and $d_{LC}$ and $d_g$ indicate thicknesses of the liquid crystal layer 60 and the dielectric sheet 53, respectively. When the depth of the groove 11a is represented by $\Delta d$, the thickness $d_{LC}'$ of the liquid crystal layer 60 at a groove region 60a is represented by $d_{LC}'=d_{LC}+\Delta d$. As is clear from the above expression, the voltage applied across the liquid crystal layer 60 at the groove region 60a is larger than a voltage applied across the liquid crystal layer 60 at the non-groove region 60b. FIG. 6 shows externally applied voltage-transmittance characteristics of the groove region 60a and the non-groove region 60b. The groove region 60a having a greater cell gap (■) is driven by a lower voltage than is the non-groove region 60b having a smaller cell gap (●). For example, the thickness of the non-groove region 60b is about 6 μm and the refractive index anisotropy Δn is about 0.08. In order to obtain satisfactory contrast, a retardation (d·Δn) of the liquid crystal layer 60 is preferably in the range of 300 nm to 600 nm.

As described above, in the plasma addressed liquid crystal display device 100 according to the present invention, the liquid crystal molecules in the groove region 60a change their alignment in response to a relatively low voltage. The above-described effect is advantageous in the response speed of the liquid crystal molecules in gray scale display. A conventional liquid crystal display device using a nematic liquid crystal material generally has a slow response speed for producing a gray scale display and poses a problem that a fast moving picture cannot be satisfactorily displayed. In contrast, in the plasma addressed liquid crystal display device according to the present invention, the liquid crystal molecules in the groove region 60a respond to a gray scale voltage more quickly than the liquid crystal molecules in the non-groove region 60b. As a result, the response speed is apparently faster in displaying a gray scale image. The larger is the depth of the groove 11a, the lower is the voltage at which the liquid crystal molecules are driven in the groove region 60a as compared with those in the non-groove regions 60b. The liquid crystal molecules in the groove region 60a lead those in the non-groove regions 60b to be driven, so that a voltage for driving the liquid crystal layer as a whole is reduced.

(Structure of Groove)

Figure 7A:
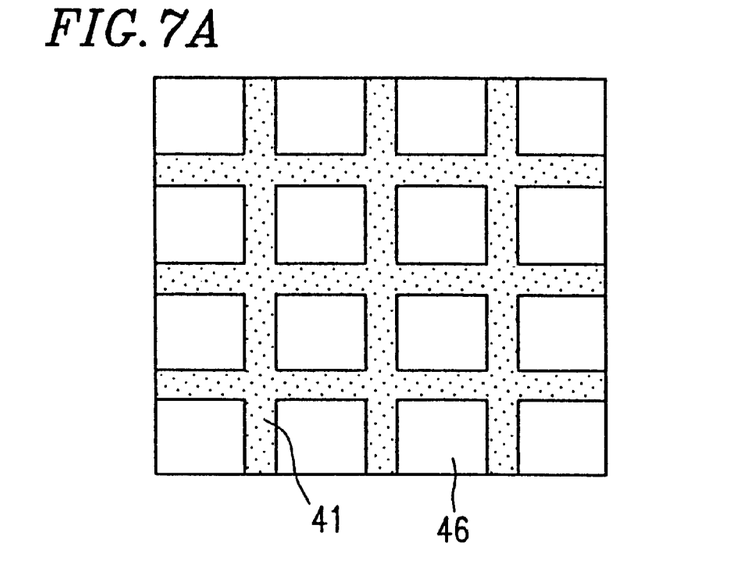
FIG. 7A is a plan view of a groove structure of the plasma addressed liquid crystal display device shown in FIG. 5, illustrating its arrangement.
Figure 7B:
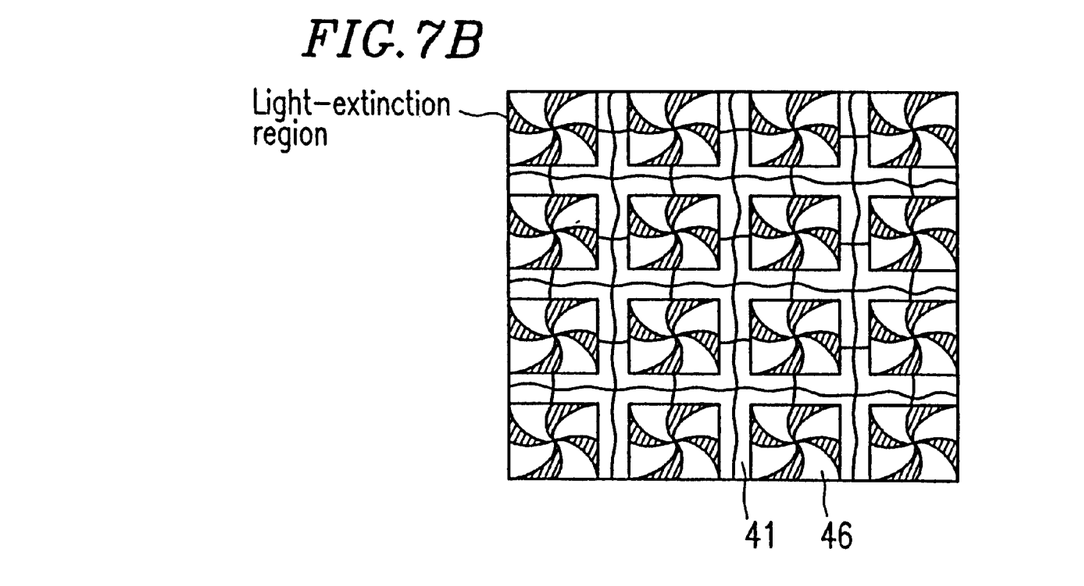
FIG. 7B is a plan view of a groove structure of the plasma addressed liquid crystal display device shown in FIG. 5, illustrating an alignment state of liquid crystal molecules in a liquid crystal region in the presence of an applied voltage in the groove structure having the arrangement shown in FIG. 7A.

FIG. 7A illustrates an example of a two-dimensional arrangement of a groove structure on a substrate. As shown in FIG. 7B, the alignment of liquid crystal molecules in a liquid crystal layer are regulated by alignment forces from grooves 41 provided in a grid pattern. In the presence of an applied voltage, liquid crystal molecules in each liquid crystal region 46 surrounded by the grooves 41 are axially symmetrically aligned about the center of the liquid crystal region 46 as a symmetry axis, by the alignment forces from the grooves 41. The shape of the liquid crystal region 46 is not limited to a square, and is variable depending on a pitch and a size of a pixel region.

According to the present invention, even if the grooves 41 are provided in the pixel region, the transmittance is not reduced. With this advantage, in a liquid crystal display device having large pixel regions, the grooves 41 can be formed in the large pixel regions so that a plurality of liquid crystal regions having axially symmetrical alignment may be provided in one pixel region. In the case where the pitch of a divided liquid crystal region (i.e., each region having axially symmetrical alignment) does not fit the pitch of the pixel region before the subdivision, the pattern of the subdivided liquid crystal regions interferes with the pattern of electrodes of a counter substrate having the same pitch as that of the pixel regions before the subdivision and therefore moire fringes occur. Preferably, the pitch of the subdivided liquid crystal regions fits the pitch of the pixel regions before the subdivision, in order to prevent the occurrence of the moire fringes. This is achieved by, for example, dividing a pixel region into a plurality of rectangular regions. Alternatively, the grooves may have different sizes. The grooves may be arranged in a striped pattern or a zigzag pattern (more effective when such a pattern is formed on both upper and lower substrates to subdivide a pixel region into four sub-regions having different alignment directions), though the axially symmetrical alignment is not obtained. In this case, the alignment directions of the liquid crystal molecules also continuously vary and therefore wide viewing angle characteristics are still obtained.

The side wall of the groove is, as described above, preferably sloped to have a modest slope angle in the range of about 5° to about 70°, instead of being perpendicular, with respect to the substrate surface. When the slope angle α (FIG. 4A) is less than about 5°, it may not be possible to control the alignment of the liquid crystal molecules. When the slope angle a exceeds about 70°, the groove is required to be deeper so that a sufficient alignment force can be obtained.

(Method for Producing the Groove Structure)

A production method of such a groove structure having a plurality of grooves preferably employs a photolithography technique using a resist material. A groove having a sloped wall can be produced by making a large distance (proximity gap) between a photomask and a substrate on which a resist layer has been formed, or by overdevelopment.

(Stabilization of Axially Symmetrical Alignment)

The state of the axially symmetrical alignment generated in the presence of an applied voltage has its stability depending on the size of the liquid crystal region surrounded by the groove regions. Even when the axially symmetrical alignment of the liquid crystal molecules is once established, the alignment is disturbed by external pressure or the like. To avoid such a case and stabilize the alignment of the liquid crystal molecules, a polymer stabilizing technique can be adopted using a photocurable monomer. Specifically, the alignment of the liquid crystal molecules can be stabilized by an alignment stabilizing layer formed of a polymer in the following way: a mixture of a liquid crystal material and a photocurable monomer is injected into a gap between two substrates, at least one of which has a groove structure thereon; the axially symmetrical alignment state is established in the presence of a predetermined applied voltage; and the photocurable monomer is cured by ultraviolet light. The resultant polymer alignment stabilizing layer is attached to a vertical alignment layer. Such a polymer layer can stabilize the alignment state. An alignment stabilizing layer including an appropriate amount of the photocurable monomer can maintain the vertical alignment in the absence of an applied voltage.

An example of the liquid crystal material is an N-type liquid crystal material (Δ∈=−4.0, Δn=0.08, optionally a chiral dopant is added). Examples of the photocurable monomer include acrylates, methacrylates, styrenes, and derivatives thereof.

EXAMPLE 1

In Example 1, a plasma addressed liquid crystal display device is produced having the same structure as that of the plasma addressed liquid crystal display device 100 shown in FIG. 5. A groove structure 11 according to Example 1 will be described with reference to FIGS. 8A and 8B.

Figure 8A:
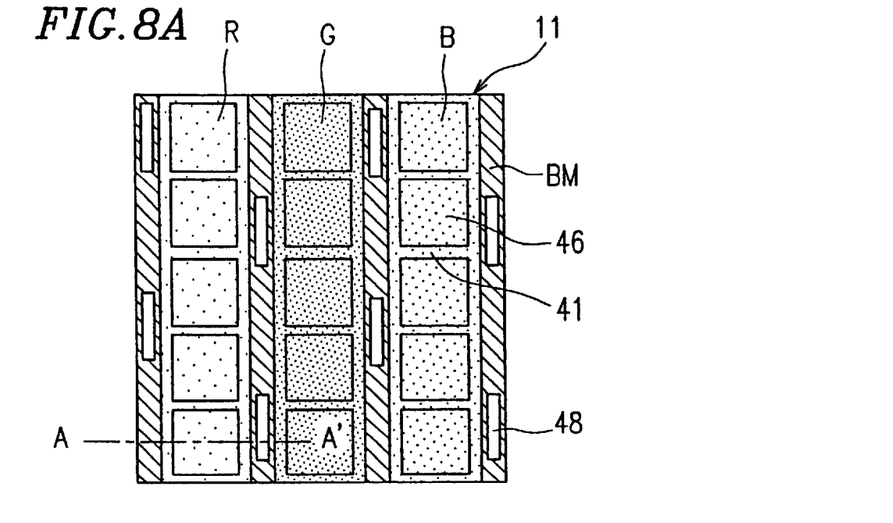
FIG. 8A is a plan view of a groove structure of a liquid crystal display device according to Example 1 of the present invention.
Figure 8B:
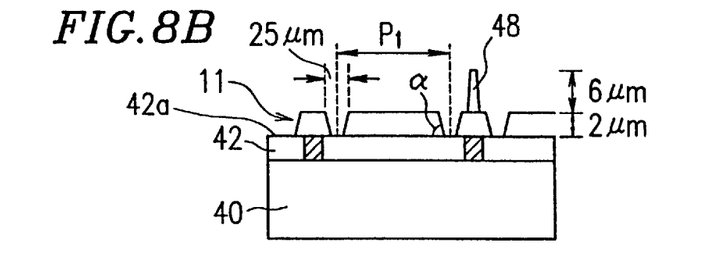
FIG. 8B is a cross-sectional view of the groove structure shown in FIG. 8A, taken along line A–A'.

The groove structure 11 is produced using a photolithography technique on a color filter layer 42 (having R, G, B, and black mask (BM) regions provided on a plate 40). Grooves 41 of the groove structure 11 are provided each having a width of about 25 μm and a depth of about 2 μm. The side walls of the groove 41 have a slope angle a of about 20°. A pitch P1 of the groove 41 that is typically equal to the width of a pixel region (i.e., the width of the liquid crystal region 46) is 120 μm. When an overcoat layer of a transparent resist and the like is provided on the color filter layer 42, the groove 41 may be formed in the overcoat layer. In this case, the overcoat layer has a function of protecting the color filter layer 42 while serving as a groove structure. Then, an indium tin oxide (ITO) layer to be transparent electrodes is formed on the plate 40 so as to cover the color filter layer 42 and the groove structure 11, to be about 0.15 μm thick by sputtering. The ITO layer is divided into a plurality of the transparent electrodes (not shown) by etching, so that the transparent electrodes each have the same width as that of the pixel region. A column-like structure 48 having a height of about 6 μm is formed so as to have discrete positions on black mask areas of the color filter layer 42. The column-like structure 48 serves as spacers. Accordingly, the cell gap (the thickness of the liquid crystal layer) is about 8 μm at a portion having the groove, and about 6 μm at the remaining portion. The resultant assembly is coated with a vertical alignment layer (e.g., JALS-204 produced by Japan Synthetic Rubber Co., Ltd.).

The resultant assembly is combined with a plasma cell which has a similar structure of the plasma cell 100b (FIG. 5).

A mixture of a liquid crystal material of negative dielectric anisotropy (Δ∈=−4.0, Δn=0.079, set to have the liquid crystal molecules therein twisted across a cell gap of 6 μm) and a monomer having the following formula is injected into a gap between the assembly having the groove structure 11 and the dielectric sheet, and then the gap is hermetically sealed.

[Formula]

After verifying with a polarization microscope that the axially symmetrical alignment of liquid crystal molecules is formed in the presence of an applied voltage across the cell, ultraviolet light irradiation is performed. Thus, an alignment stabilizing layer and a liquid crystal layer are formed. The alignment stabilizing layer stabilizes the axially symmetrical alignment of the liquid crystal molecules in the liquid crystal layer. A retardation (d·Δn) of the liquid crystal layer preferably is in the range of 300 nm to 600 nm. In Example 1, the retardation is about 474 nm. The plasma addressed liquid crystal display device obtained in such a manner has wide viewing angle characteristics vertically and horizontally.

EXAMPLE 2

Figure 9:
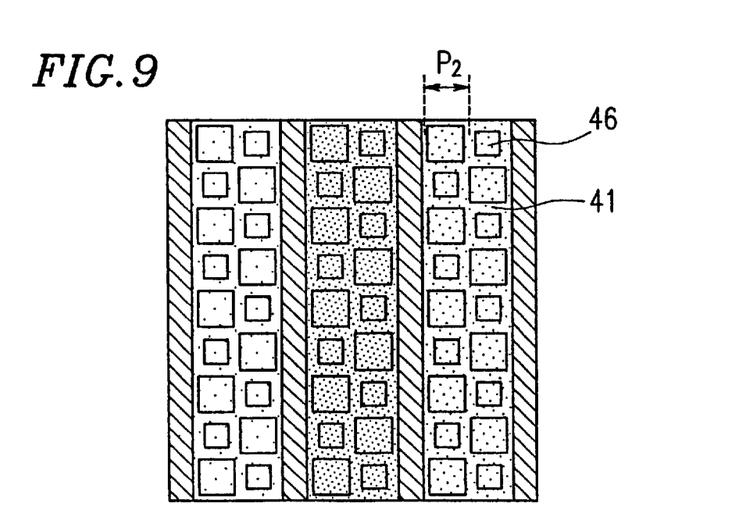
FIG. 9 is a plan view of a sub-divided groove structure of a liquid crystal display device according to Example 2 of the present invention.

In Example 2 of the present invention, as illustrated in FIG. 9, a liquid crystal region is subdivided. A liquid crystal material is used with no addition of a monomer. Except the above points, a plasma addressed liquid crystal display device of Example 2 is the same as that of Example 1.

In the plasma addressed liquid crystal display device according to Example 2 of the present invention, the axially symmetrical alignment is achieved in the presence of an applied voltage. Wide viewing characteristics are obtained as in Example 1. Without any technique for stabilizing the alignment of the liquid crystal molecules using a monomer (polymer stabilizing technique), the axially symmetrical alignment can be stabilized when a pitch P2 of the groove 41 is about 60 μm or less, preferably about 30 μm or less. In such a subdivision arrangement, an alignment force from the groove 41 is sufficiently strong to be spread throughout the entire liquid crystal layer, and thus the axially symmetrical alignment can be stabilized without any monomer.

COMPARATIVE EXAMPLE

In the Comparative example, a protrusion-like structure having a height of about 3 μm is formed in a grid pattern, instead of the groove structure 11 on the same color filter layer as that in Example 1. A transparent electrode is formed over the resultant assembly. A column-like structure having a height of about 3 μm is then formed on the transparent electrode, serving as spacers. A liquid crystal material mixed with a monomer is used as in Example 1. Except the above points, the plasma addressed liquid crystal display device of the Comparative example is the same as that of Example 1. The characteristics of the plasma addressed liquid crystal display device of the Comparative example are shown in the Table as well as those of Examples 1 and 2.

TABLE

| Item | Example 1 | Example 2 | Comparative example |
|---|---|---|---|
| Transmittance ratio at 80 V | 1.10 | 1.15 | 1 |
| Response time for 0→40 V gray scale (rising) | 110 ms | 95 ms | 150 ms |

As shown in the Table, the transmittance in the device of the Comparative example is lower since the liquid crystal molecules on the protrusion-like structure do not sufficiently respond to an applied voltage. In Examples 1 and 2, the liquid-crystal molecules in the groove region are supplied with a voltage sufficiently as compared with those in the other portions. Therefore, the transmittance of the groove region is quickly increased at a relatively low voltage, so that the transmittance of the entire liquid crystal region is improved. The devices in Examples 1 and 2 use more types of materials for producing the groove structure and the like (e.g., transparent resist material) in the pixel region as compared with the Comparative example. Nevertheless, the contribution of the groove regions to the transmittance is sufficiently large to improve the transmittance of the entire liquid crystal display. The device in Example 2 can obtain a shorter response time than in Example 1, even though the alignment is not stabilized by the polymer stabilizing layer.

In the above examples, the groove structure of the present invention is applied to plasma addressed liquid crystal displays. The present invention is also applicable to active matrix liquid crystal display devices or simple matrix liquid crystal display devices.

The N-type liquid crystal material of negative dielectric anisotropy is used in the above-described liquid crystal display devices of the present invention. A P-type liquid crystal material having positive dielectric anisotropy may be used. In this case, another suitable alignment layer may be used instead of the vertical alignment layer.

As described above, in the liquid crystal display device according to the present invention, the grooves of the groove structure have such alignment forces that continuously vary the alignment directions of liquid crystal molecules. A portion of a liquid crystal layer directly above a protrusion-like structure which is not effective in display in a conventional ASM mode liquid crystal display device is available for display in the liquid crystal display device of the present invention, thereby improving the transmittance of the device. In a plasma addressed liquid crystal display device of the present invention, a voltage applied to the liquid crystal molecules in the groove region is higher than a voltage applied to the liquid crystal molecules in the liquid crystal regions. Therefore, the response speed of the liquid crystal molecules in the groove region is relatively fast and thus the response speed of the liquid crystal molecules of the entire liquid crystal layer is improved. The response speed for producing a gray scale image is significantly improved as compared with the prior art. Furthermore, the stability of the axially symmetrical alignment is so superior that the axially symmetrical alignment can be stable even when an external force is exerted on the device or quick switching is performed.

The liquid crystal display device of the present invention has superior viewing angle characteristics and thus is suitable for a large size liquid crystal display device, particularly for a plasma addressed liquid crystal display device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:
   a first substrate;
   a second substrate;
   a liquid crystal layer having liquid crystal molecules interposed between the first and second substrates;
   a groove structure comprising a plurality of grooves provided on the first substrate, each of the plurality of grooves having a width smaller than a distance between adjacent grooves;
   wherein the liquid crystal layer includes a plurality of liquid crystal regions defined by the plurality of grooves;
   wherein an upper surface of each of the grooves is covered by an electrode layer so that the electrode layer is disposed on and in contact with the upper surface of the first substrate in a base region of each of the grooves; and wherein liquid crystal molecules in at least one of the liquid crystal regions are axially symmetrically aligned.

2. A liquid crystal display device according to claim 1, further comprising a vertical alignment layer provided on a surface of at least one of the first and second substrates facing the liquid crystal layer, wherein the liquid crystal layer includes a liquid crystal material of negative dielectric anisotropy.

3. A liquid crystal display device according to claim 2, wherein the first and second substrates respectively have polarizers, the polarization axes of the polarizers are perpendicular to each other, and a compensation film is provided between at least one of the polarizers and the substrate including the at least one of the polarizers.

4. A liquid crystal display device according to claim 1, wherein a transparent electrode is provided between the liquid crystal layer and the groove-structure.

5. A liquid crystal display device according to claim 1, wherein at least two of the liquid crystal regions correspond to a pixel region, and at least one of the grooves is provided in the pixel region.

6. A liquid crystal display device according to claim 1, wherein a product of a thickness d of the liquid crystal layer at the liquid crystal region and refractive index anisotropy $\Delta n$, i.e., $d \cdot \Delta n$, is in the range of about 300 nm to about 600 nm.

7. The display device of claim 1, wherein spacers for spacing the first and second substrates from one another are provided over or on top of said groove structure.

8. The display device of claim 1, wherein grooves are formed in the electrode layer, due to the electrode layer covering the grooves of the groove structure.

9. A liquid crystal display device, comprising:
a first substrate;
a second substrate;
a liquid crystal layer having liquid crystal molecules interposed between the first and second substrates;
a groove structure comprising a plurality of grooves provided on the first substrate, each of the plurality of grooves having a width smaller than a distance between adjacent grooves;
wherein the liquid crystal layer includes a plurality of liquid crystal regions defined by the plurality of grooves;
wherein an upper surface of each of the grooves is covered by an electrode layer so that the electrode layer is disposed on and in contact with the upper surface of the first substrate in a base region of each of the grooves; and
wherein the liquid crystal regions are axially symmetric liquid crystal regions, and in absence of voltage across the liquid crystal layer liquid crystal molecules above the groove structure are aligned substantially perpendicular relative to the substrates except for liquid crystal molecules within or over the grooves, and as voltage is applied across the liquid crystal layer the liquid crystal molecules in or over the grooves tilt toward a direction parallel to the substrates.

10. A liquid crystal display device, comprising:
a first substrate;
a second substrate;
a liquid crystal layer having liquid crystal molecules interposed between the first and second substrates;
a groove structure comprising a plurality of grooves provided on the first substrate;
wherein the liquid crystal layer includes a plurality of liquid crystal regions defined by the plurality of grooves;
wherein a side wall of the plurality of grooves is sloped with respect to a substrate surface;
wherein an upper surface of each of the grooves is covered by an electrode layer so that the electrode layer is disposed in a base region of each of the grooves so that the electrode layer contacts a layer beneath the groove structure via an opening in the groove structure provided at the base region; and
wherein the liquid crystal regions are axially symmetric liquid crystal regions, and in absence of voltage across the liquid crystal layer liquid crystal molecules above the groove structure are aligned substantially perpendicular relative to the substrates except for liquid crystal molecules within or over the grooves, and as voltage is applied across the liquid crystal layer the liquid crystal molecules in or over the grooves tilt toward a direction parallel to the substrates.

11. A liquid crystal display device according to claim 10, wherein a slope angle of the sloped side wall is in the range of about 5° to about 70°.

12. The display device of claim 10, wherein grooves are formed in the electrode layer, due to the electrode layer covering the grooves of the groove structure.

13. A liquid crystal display device, comprising:
a first substrate;
a second substrate;
a liquid crystal layer having liquid crystal molecules interposed between the first and second substrates;
a groove structure comprising a plurality of elongated grooves provided on the first substrate;
wherein the liquid crystal layer includes a plurality of liquid crystal regions defined by the plurality of elongated grooves;
wherein spacers for spacing the first and second substrates from one another are provided over or on top of said groove structure;
wherein an upper surface of the grooves is covered by an electrode layer so that the electrode layer is disposed on and in contact with the first substrate in a base region of a plurality of the grooves; and
wherein the liquid crystal regions are axially symmetric liquid crystal regions, and in absence of voltage across the liquid crystal layer liquid crystal molecules above the groove structure are aligned substantially perpendicular relative to the substrates except for liquid crystal molecules within or over the grooves, and as voltage is applied across the liquid crystal layer the liquid crystal molecules in or over the grooves tilt toward a direction parallel to the substrates.

14. The display device of claim 13, wherein a plurality of said spacers are column-like spacers.

15. The display device of claim 13, wherein grooves are formed in the electrode layer, due to the electrode layer covering the grooves of the groove structure.

16. A liquid crystal display device, comprising:
a first substrate;
a second substrate;
a liquid crystal layer having liquid crystal molecules interposed between the first and second substrates;
a groove structure comprising a plurality of grooves provided on the first substrate, each of the plurality of grooves having a width smaller than a distance between adjacent grooves;

wherein the liquid crystal layer includes a plurality of liquid crystal regions defined by the plurality of grooves;

wherein an upper surface of each of the grooves is covered by an electrode layer so that the electrode layer is disposed on and in contact with the upper surface of the first substrate in a base region of each of the grooves; and wherein the plurality of grooves are disposed in a grid pattern.

17. A liquid crystal display device, comprising:

a first substrate;

a second substrate;

a liquid crystal layer having liquid crystal molecules interposed between the first and second substrates;

a groove structure comprising a plurality of grooves provided on the first substrate, each of the plurality of grooves having a width smaller than a distance between adjacent grooves;

wherein the liquid crystal layer includes a plurality of liquid crystal regions defined by the plurality of grooves;

wherein an upper surface of each of the grooves is covered by an electrode layer so that the electrode layer is disposed on and in contact with the upper surface of the first substrate in a base region of each of the grooves; and wherein said grooves are all elongated, and include a first group of elongated grooves extending in an x direction and a second group of elongated grooves extending in a y direction perpendicular to said x direction, wherein grooves of said first group intersect grooves of said second group.

18. A liquid crystal display device, comprising:

a first substrate;

a second substrate;

a liquid crystal layer having liquid crystal molecules interposed between the first and second substrates;

a groove structure comprising a plurality of grooves provided on the first substrate, each of the plurality of grooves having a width smaller than a distance between adjacent grooves;

wherein the liquid crystal layer includes a plurality of liquid crystal regions defined by the plurality of grooves;

wherein an upper surface of each of the grooves is covered by an electrode layer so that the electrode layer is disposed on and in contact with the upper surface of the first substrate in a base region of each of the grooves; and wherein one of the first and second substrates is a plasma cell having a plasma channel for applying voltage to the liquid crystal layer.

19. A liquid crystal display device, comprising:

a first substrate;

a second substrate;

a liquid crystal layer having liquid crystal molecules interposed between the first and second substrates;

a groove structure comprising a plurality of grooves provided on the first substrate, each of the plurality of grooves having a width smaller than a distance between adjacent grooves;

wherein the liquid crystal layer includes a plurality of liquid crystal regions defined by the plurality of grooves;

wherein an upper surface of each of the grooves is covered by an electrode layer so that the electrode layer is disposed on and in contact with the upper surface of the first substrate in a base region of each of the grooves;

a vertical alignment layer provided on a surface of at least one of the first and second substrates facing the liquid crystal layer, wherein the liquid crystal layer includes liquid crystal material of negative dielectric anisotropy; and wherein a polymer layer for stabilizing an alignment state of the liquid crystal layer is provided on the vertical alignment layer.

20. A liquid crystal display device, comprising:

a first substrate;

a second substrate;

a liquid crystal layer having liquid crystal molecules interposed between the first and second substrates;

a groove structure comprising a plurality of grooves provided on the first substrate, each of the plurality of grooves having a width smaller than a distance between adjacent grooves;

wherein the liquid crystal layer includes a plurality of liquid crystal regions defined by the plurality of grooves;

wherein an upper surface of each of the grooves is covered by an electrode layer so that the electrode layer is disposed on and in contact with the upper surface of the first substrate in a base region of each of the grooves; and wherein the alignment directions of the liquid crystal molecules continuously vary in at least one of the plurality of liquid crystal region.

21. A liquid crystal display device according to claim 20, wherein the alignment directions of the liquid crystal molecules continuously vary from within the groove to a region directly above the groove to an inward region of the liquid crystal region.

* * * * *